(12) United States Patent
Weidinger et al.

(10) Patent No.: US 7,017,725 B2
(45) Date of Patent: Mar. 28, 2006

(54) CENTRIFUGAL CLUTCH

(75) Inventors: Reinhold Weidinger, Kolitzheim (DE); Winfried Stürmer, Euerbach (DE)

(73) Assignee: ZF Sachs AG, Schweinfurt (DE)

( * ) Notice: Subject to any disclaimer, the term of this patent is extended or adjusted under 35 U.S.C. 154(b) by 63 days.

(21) Appl. No.: 10/861,284

(22) Filed: Jun. 4, 2004

(65) Prior Publication Data

US 2004/0262119 A1 Dec. 30, 2004

(30) Foreign Application Priority Data

Jun. 30, 2003 (DE) .............................. 103 29 310

(51) Int. Cl.
*F16D 43/12* (2006.01)
(52) U.S. Cl. .................. 192/83; 192/70.27; 192/89.22; 192/103 A; 192/105 B
(58) Field of Classification Search ...................... None
See application file for complete search history.

(56) References Cited

U.S. PATENT DOCUMENTS

| | | | | |
|---|---|---|---|---|
| 2,368,299 A | * | 1/1945 | Hayter | 192/103 A |
| 3,035,460 A | * | 5/1962 | Guichard | 475/186 |
| 4,485,905 A | * | 12/1984 | Radbo et al. | 192/103 A |
| 6,533,056 B1 | * | 3/2003 | Maimone | 180/230 |
| 6,705,446 B1 | * | 3/2004 | Drussel et al. | 192/83 |

FOREIGN PATENT DOCUMENTS

| | | |
|---|---|---|
| DE | 1 087 460 | 8/1960 |
| JP | 55044166 A | * 3/1980 |

* cited by examiner

*Primary Examiner*—Richard M. Lorence
(74) *Attorney, Agent, or Firm*—Cohen, Pontani, Lieberman & Pavane

(57) ABSTRACT

A centrifugal clutch includes a housing which is rotatable about an axis, the housing having a plurality of first supporting areas which each extend radially with respect to the axis; a pressing plate which is axially movable with respect to the housing and is coupled to the housing for rotation about the axis; and a supporting element which is axially movable with respect to the housing, the supporting element having a plurality of second supporting areas which each extend radially with respect to the axis, each second support area being separated from a respective first support area by an axial distance which decreases with radial distance from the axis. A plurality of centrifugal members are supported between respective pairs of first and second support areas, each the centrifugal member being radially displaceable by centrifugal force along the respective pair of support areas to exert force along a force transmission path between the supporting element and the pressing plate. An energy accumulator arrangement acts between the supporting element and the pressing plate to load the pressing plate away from the supporting element in a clutch engaging direction, and a clutch release arrangement provides a releasing force in opposition to the load of the energy accumulator arrangement.

5 Claims, 4 Drawing Sheets

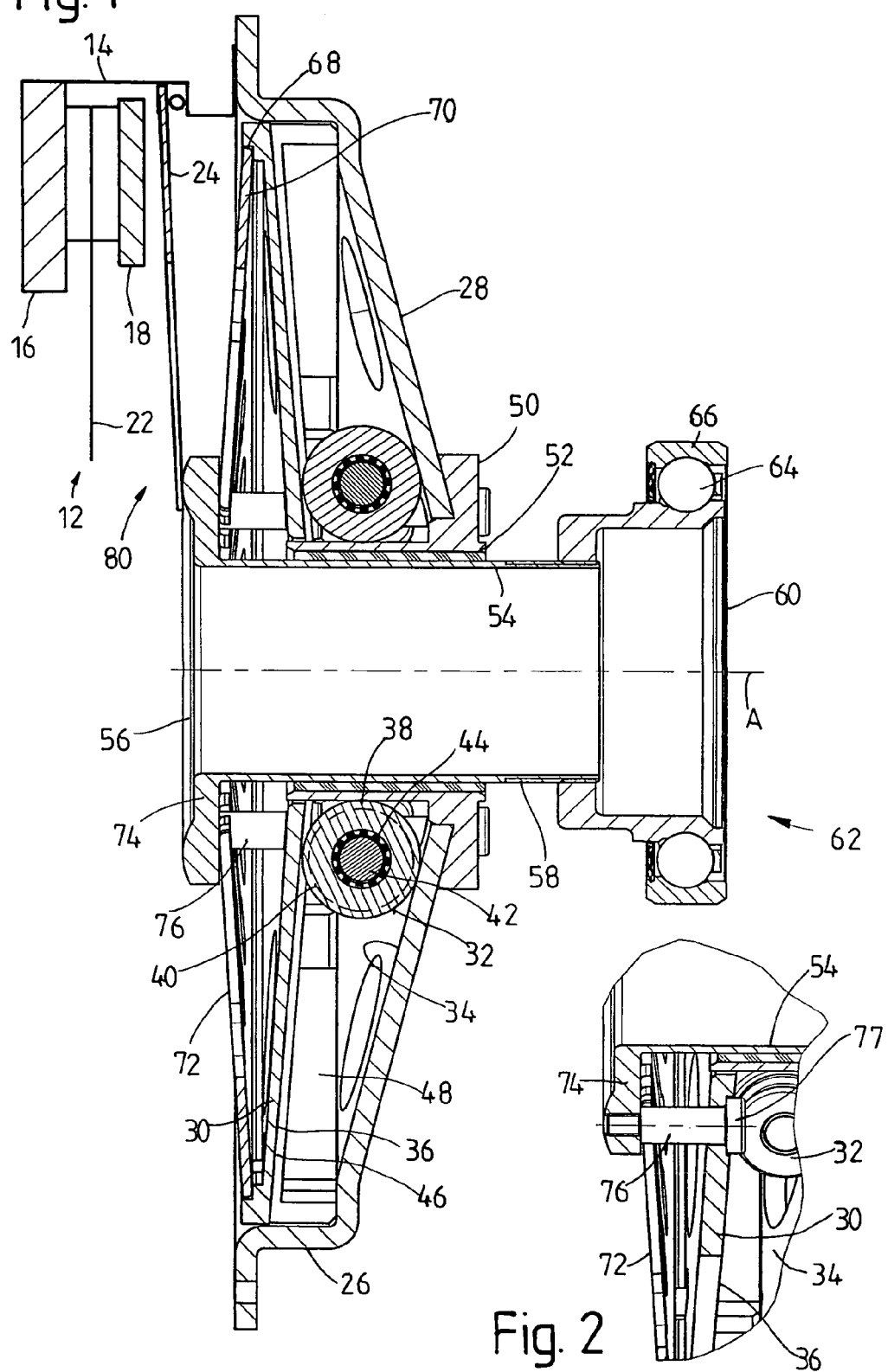

CENTRIFUGAL CLUTCH

BACKGROUND OF THE INVENTION

1. Field of the Invention

The present invention is directed to a centrifugal clutch comprising a housing arrangement and a pressing plate which is coupled with the housing arrangement so as to rotate together with the latter around an axis of rotation and so as to be movable in the direction of the axis of rotation.

2. Description of the Related Art

A centrifugal clutch which can be used in motor vehicles is known from DE-AS-1 087 460. This centrifugal clutch comprises centrifugal members, particularly roller elements, which can be displaced radially outward under the influence of centrifugal force. Supporting areas are formed for these roller elements at a clutch housing on one side and at a clutch pressing plate on the other side. Supporting areas associated with one another have a distance relative to one another which decreases toward the radial outer side so that when the centrifugal members are acted upon toward the radial outer side and the centrifugal members are consequently displaced toward the radial outer side by the generated wedge effect, the pressing plate is acted upon in the engagement direction. Accordingly, the actuating force or pressing force exerted on the pressing plate depends substantially upon the rotational speed in the system.

SUMMARY OF THE INVENTION

It is the object of the present invention to provide a centrifugal clutch in which it is possible to respond to the occurrence of critical situations during sustained torque transmission.

According to the invention, a supporting element which is movable axially with respect to the housing arrangement and a plurality of centrifugal members are provided. Every centrifugal member is supported with respect to the housing arrangement in a first supporting area extending radially from the inside to the outside and is supported with respect to the supporting element in a second supporting area extending radially from the inside to the outside. An axial distance between the first supporting area and the second supporting area of a respective pair of supporting areas which is associated with a centrifugal member decreases radially from the inside to the outside, and every centrifugal member is displaceable radially along the pair of supporting areas associated with it under the influence of centrifugal force. An energy accumulator arrangement acts between the supporting element and the pressing plate to load the pressing plate away from the supporting element in the engagement direction, and a clutch release arrangement provides a releasing force opposed to the impingement action of the energy accumulator arrangement.

First, an elemental aspect of the present invention is that an energy accumulator arrangement is incorporated in the force transmission path between the centrifugal members and the pressing plate, which accordingly means that there is a determined elasticity between the supporting element and the pressing plate which contributes to energy accumulation. The present invention makes use of this coupling between the supporting element and the pressing plate, which is accordingly not rigid, to provide, when necessary, by means of a release arrangement, a releasing force that can act against the action which is provided by the energy accumulator arrangement and which acts upon the pressing plate generally in the engagement direction so as to reduce the pressing force still acting in the area of the pressing plate or, if necessary, to completely cancel this pressing force and to release the clutch at least partially. Since the action of the energy accumulator arrangement can be opposed in this way, this transition to a released state or to a further released state can also take place when the centrifugal members are acted upon due to centrifugal force in such a way that a displacement toward the radial inner side, which is possible in principle when these centrifugal members are increasingly pressed in, does not occur. That is, in the centrifugal clutch according to the invention, the pressing plate can be displaced in the releasing direction due to the elasticity or energy accumulator arrangement provided between the pressing plate and the supporting element even when it would be impossible to "release" the centrifugal clutch due to the prevailing centrifugal forces.

For example, it can be provided in the centrifugal clutch according to the invention that the energy accumulator arrangement comprises a first energy accumulator in the force transmission path between the supporting element and the pressing plate, wherein the first energy accumulator is supported with respect to the supporting element, and a second energy accumulator in the force transmission path between the supporting element and the pressing plate, wherein the second energy accumulator is supported with respect to the pressing plate and, further, the first energy accumulator and second energy accumulator are supported with respect to one another, in order to act upon the pressing plate and the intermediate plate in the direction away from each other, and that the clutch release arrangement acts on the first energy accumulator. In this way, a self-contained autarkic system is provided in which the pressing plate itself is not acted upon directly in order to carry out emergency clutch release processes, but rather the action upon the pressing plate in the engagement direction can be reduced by acting upon the energy accumulator arrangement, namely, the second energy accumulator in particular.

For this purpose, it can be provided, for example, that the release arrangement comprises a transmission element which is movable axially with respect to the housing arrangement, the first energy accumulator and the second energy accumulator being supported with respect to this transmission element in working directions that are substantially opposed to one another, and that the transmission element can be acted upon by a releasing force which is directed substantially opposite to the working direction of the first energy accumulator.

In order to ensure that a determined minimum force can be generated by the second energy accumulator without elastic deformation of the latter, it is further suggested that an axial movement limiting arrangement is provided for limiting the relative axial movement between the supporting element and the transmission element.

Since the centrifugal clutch according to the invention is intended to operate in the normal state in the desired manner according to the centrifugal force design of the centrifugal clutch, particularly so that the coupling characteristic is not substantially impaired by the component introduced for the emergency or active actuating process, it is further suggested that the force provided by the first energy accumulator is greater than the force provided and/or transmitted by the second energy accumulator in all adjusted states of the friction clutch. In this way, it is ensured that, in the normal state, the first energy accumulator acts substantially as a rigid structural component part which cannot be compressed axially and, to this extent, the working characteristic of the clutch is not impaired by providing this additional energy accumulator. The elasticity of this additional first centrifugal clutch is not noticeable until correspondingly high actuating forces are actively generated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a longitudinal section through a centrifugal clutch according to the invention;

FIG. 2 shows a detail of an axial movement limiting device in the centrifugal clutch shown in FIG. 1.

DETAILED DESCRIPTION OF THE PRESENTLY PREFERRED EMBODIMENTS

Figure 3:
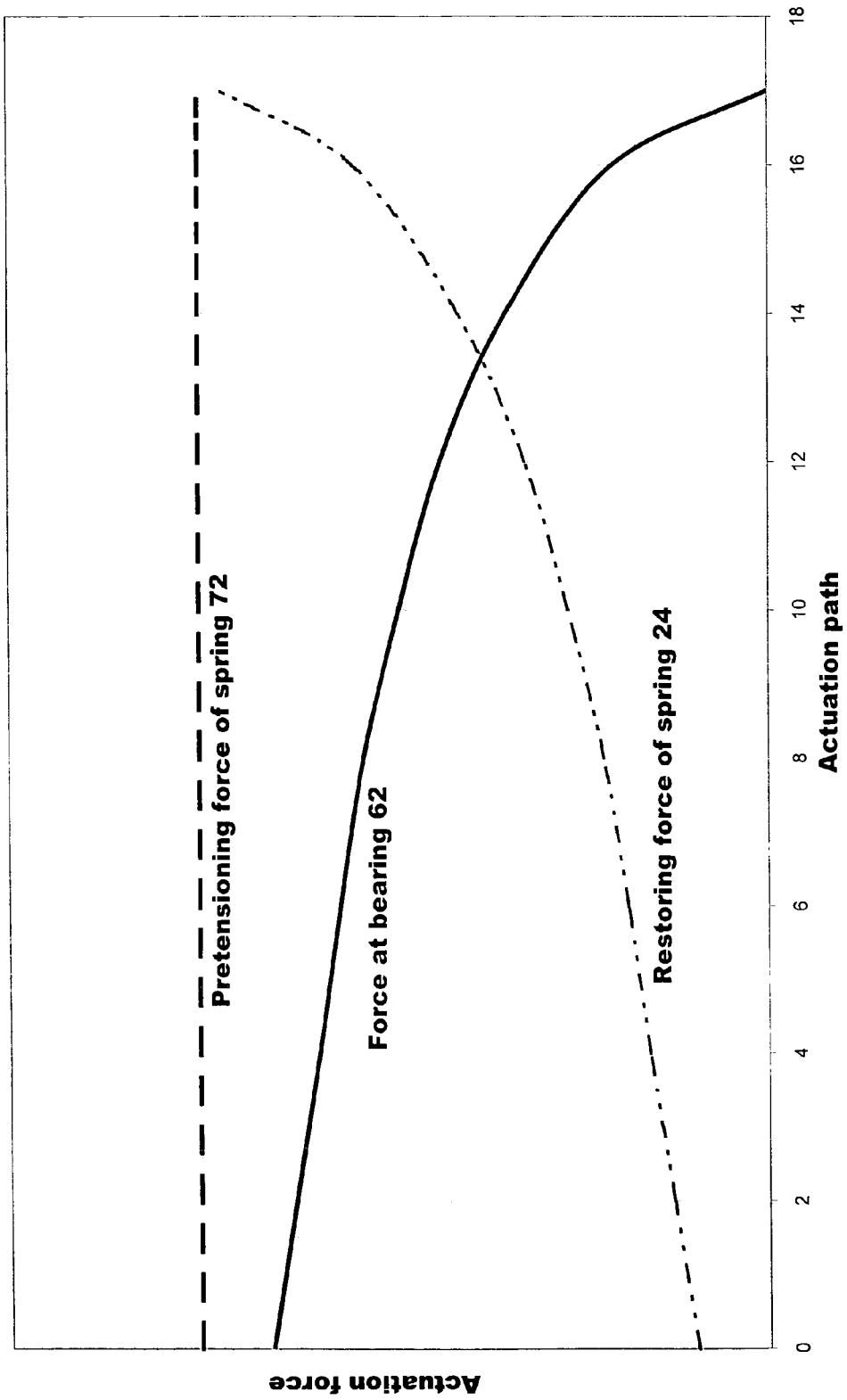
FIGS. 3 to 5 show actuating path/actuating force diagrams for different spring designs.

FIG. 1 shows an actuating force generating arrangement 10 in combination with a friction clutch 12, otherwise indicated only schematically, such as is used in a motor vehicle, particularly in a utility or commercial vehicle, in connection with an automatic transmission. This friction clutch 12 comprises a housing 14, shown schematically, which is fixedly connected to a flywheel 16. In the housing 14 is a pressing plate 18 which is coupled with the housing 14, e.g., by tangential leaf springs or the like which simultaneously also provide a lifting force, so as to be fixed with respect to rotation relative to it but movable in the direction of an axis of rotation A. The friction linings 20 of a clutch disk 22 are arranged between the pressing plate 18 and the flywheel 16. An actuating force transmission element 24 which is constructed as a diaphragm spring, for example, is supported with respect to the housing 14 at the radial outer side in both axial directions and, farther radially inward, acts upon the pressing plate 18, e.g., by means of a wear compensating device. The actuating force transmission element 24 is constructed and installed in such a way, for example, that it is held under pretensioning in the clutch releasing direction, that is, in this case, in the direction of the actuating force generating arrangement 10, so that for purposes of engagement an axially directed actuating force corresponding to the pretensioning force of the actuating force transmission element 24 must be provided initially by the actuating force generating arrangement 10 in order to move the pressing plate 18 in the direction of the friction linings 20.

The actuating force generating arrangement 10 also comprises a substantially annular or cup-shaped housing 26 which can be connected on the radial outer side to the housing 14 of the friction clutch 12 or can be constructed integral with it. In this housing 26, a ring-shaped or annular disk-shaped supporting element 30 is provided axially opposite from a housing base area 28. A plurality of roller elements 32 presenting centrifugal members arranged so as to be distributed in circumferential direction and preferably at the same circumferential distance from one another are located between the supporting element 30 and the housing base area 28. A first supporting area 34 and second supporting area 36 associated with each roller element 32 are provided at the housing 26 and supporting element 30, each supporting area 34 and 36 providing a rolling track or rolling path. The supporting areas 34, 36 extend radially from the inner side to the outer side. The roller elements 32 are constructed in such a way that they have a central roller element 38 with a greater diameter as can be seen the drawing. As is indicated in FIG. 1 at bottom by dashed lines, lateral roller elements 40 are located on both sides of this central roller element 38 in circumferential direction and are fixedly connected to one another by an axle part 42 and substantially freely rotatable with respect to the central roller element 38 by a bearing, e.g., a rolling body bearing 44. These lateral roller elements 40 are supported at the second supporting area 36 of the supporting element 30. It will be seen in FIG. 1 that each of these second supporting areas 36 provides a groove-like depression 46 associated with the central roller element 38, so that when the lateral roller elements 40 rest on or roll on the second supporting area 36 at both sides of this groove-like depression area 46, the central roller element 38 does not have rolling contact with the supporting element 30 as can also be seen from FIG. 1. Further, in order to provide a guide for the roller elements, substantially radially extending guide walls 48 are provided on both sides of a respective second supporting area 36, so that the roller elements 32 can move substantially only in radial direction, specifically, without tilting.

It will further be seen from FIG. 1 that the supporting areas 34, 36 associated with a respective roller element 32 are oriented with respect to one another in such a way that their distance from one another decreases radially from the inside to the outside. This can be achieved, for example, in that the two supporting areas 34, 36 are inclined relative to one another and relative to the axis of rotation A, e.g., they are inclined in the same direction, so that a relative inclination angle not equal to zero is formed between the two supporting areas 34, 36 of a respective pair of supporting areas 34, 36 associated with a roller element 32 in every radial area.

FIG. 1 shows the nonrotating rest state in which, due to the above-mentioned pretensioning provided by the actuating force transmission element 24 and the relative inclination angle or wedge angle formed between the respective supporting areas 34, 36, the centrifugal elements 32 are pretensioned radially inward and are held in their radial innermost position. A sleeve-like first guide element 50 which is fixedly connected to the housing 26 by riveting or the like limits movement toward the radial inner side. It is noted that a second sleeve-like guide element 54 is guided in this first sleeve-like guide element 50, e.g., with the intermediary of a sliding bearing element 52 or the like, so as to be movable axially, the supporting element 30 being, for example, fixedly connected to it in order to ensure that the supporting element 30 cannot tilt when displaced axially. An annular impingement element 56 can be provided at this second sleeve-like guide element 50, and the actuating force can be introduced into the actuating force transmission element 24 through this annular impingement element 56.

It will be seen further that the second guide sleeve 54 is provided at an end area with an external thread 58 to which is screwed an inner race 60 of an actuation bearing 62, which inner race 60 is provided with an internal thread. In this way, a fixed coupling is provided between the actuation bearing 62 and the sleeve 58. Of course, this fixed coupling may be formed in a different manner, e.g., by welding or the like. An outer race 66 of the actuation bearing is coupled with the inner race 60 by a plurality of bearing balls 64 so as to be fixed axially but rotatable relative to it.

In the radial outer edge area of the supporting element 30, the latter is constructed with a supporting step 68. A radial outer, e.g., annular, area 70 of a spring element 72 which is likewise constructed, for example, as a diaphragm spring or disk spring or the like can be supported at this supporting step 68. This spring element 72 extends radially inward, e.g., with spring tongues or the like, to the extent that it is supported radially at a flange area 74 provided at the sleeve 54. In order to hold the spring element 72 under pretensioning between the supporting element 30 and the flange area 74 of the sleeve 54, a plurality of movement limiting bolts 76 are provided. As can be seen in FIG. 2, these movement limiting bolts 76 are screwed into the flange area 74 or can be fixed in the latter in some other way and engage by their expanded head areas 77 behind the supporting element 30 at its side remote of the flange area 74 and can engage, for example, in correspondingly shaped recesses so as to achieve surface-area contact also in case of an inclined arrangement of the supporting element 30. In this way, it is possible for the flange area 74 and the radial inner area of the supporting element 30 to approach one another in axial direction by compression of the spring element 72.

It will be seen from the preceding description that the actuating force transmission element 24 which is constructed, e.g., as a diaphragm spring, and the spring element 72 form a spring arrangement or energy accumulator arrangemen 80. The latter is supported with respect to the supporting element 30 and the pressing plate, so that an elasticity is formed between this supporting element 30 and the pressing plate 18 which, in principle, enables a relative displacement between the supporting element 30 and the pressing plate 18. This is used in accordance with the principles of the present invention to actuate the friction clutch 12 by introducing an actuating force to the actuation bearing 62 in addition to or counter to the pressing force generated by the roller elements 32, i.e., for example, for adjustment in the releasing direction or for reinforced adjustment in the engagement direction. This manner of operation of the friction clutch 12 shown in FIG. 1 with the actuating force generating arrangement will be described in the following.

First, it is assumed that the clutch is in normal operation, i.e., in the transition to a rotating state the roller elements 32 are acted upon by centrifugal force and push radially outward. Due to the wedge angle formed toward the radial outer side between the supporting areas 34, 36, a force is exerted on the supporting element 30 which presses the latter toward the left with reference to the view in FIG. 1, that is, in the direction of the pressing plate 18. By way of the spring element 72 which is held under pretensioning, the supporting element 30 acts upon the sleeve 54 or flange-like area 74 thereof which in turn acts upon the radial inner end areas of the actuating force transmission element 24. Due to the lever ratio formed by this actuating force transmission element 24 and diaphragm spring element, an actuating force multiplied, e.g., by a factor of 1:6 is transmitted to the pressing plate 18 resulting in a correspondingly increased actuating lift and a correspondingly favorable proportioning. The two elasticities or spring elements 24, 72 are designed and adapted in such a way that the minimum force already generated by the spring element 72, also by the pretensioning of the latter, is greater, specifically for every adjusting state, than the forces acting in the releasing direction, particularly the spring force of the actuating force transmission element 24. Therefore, in normal clutch operation, there is no state in which a relative movement occurs between the supporting element 30 and the sleeve 54.

When a vehicle which is outfitted with a friction clutch 12 of this type enters into normal operation, that is, when, at a comparatively high rotational speed of the drive unit, it enters a state in which an interruption of the torque transmission is required for reasons of safety or for reasons pertaining to the state of the vehicle, the sleeve 54 can be displaced axially by introducing an actuating force via the actuation bearing 62 against the pretensioning action of the spring element 72 while the roller elements 32 are held without change in their radial outermost position, for example. This axial displacement runs against the pretensioning action or dynamic effect of the spring element 72, but is reinforced by the force of the actuating force transmission element 24 acting in the releasing direction. This can also be reinforced by the lifting springs mentioned above which likewise generate a force component acting in the releasing direction. When using a clutch disk 22 with lining suspension, this lining suspension also generates a force component directed in the releasing direction at least in the state in which the pressing plate 18 still contacts the clutch disk 22. This force component, like the force component generated by the lifting suspension, is transmitted to the sleeve 54 through the actuating force transmission element 24. Accordingly, the force to be applied by an actuating system is substantially determined by a difference of these force components of the spring element 72 acting counter to one another and of the actuating force transmission element 24 or lifting springs and the lining suspension. When passing from the state in which a compulsory interruption in the drivetrain was required although at sustained high rotational speed, the sleeve 54 can be released again and, due to the force generated by the spring element 72, the friction clutch reaches its engagement state again.

If this emergency state occurred during a phase in which the roller elements 32 were not in their radial outermost position in which appreciably greater forces would have to be introduced for moving the roller elements 32 radially inward toward the supporting elements 30 due to the change in the wedge angle and, to this extent, a radial displacement of the roller elements 32 would not occur during compulsory release, then the force transmitted by the sleeve 54 over the spring element 72 to the supporting element 30 can result in a compulsory displacement of the roller elements 32 radially inward. Accordingly, in this case a state can occur in which the actuating force required for the compulsory opening of the friction clutch 12 is determined on the one hand by the force of the actuating force transmission element 24 acting in the releasing direction and is determined on the other hand by the impingement or action upon the supporting element 30 in the engagement direction still occurring as a result of centrifugal force.

Further, it is also possible in the system according to the invention to generate forces in the acting direction by the actuation bearing 62 and to introduce these forces into the friction clutch 12. This may be required, for example, when a faster closing of the friction clutch 12 than would occur through centrifugal force is desirable or required in certain phases at rotational speeds which are still comparatively low, e.g., when switching or when driving up hills. Accordingly, in this case the actuating force transmission element 24 can be acted upon in the engagement direction and the pressing plate 18 can be displaced in a corresponding manner. This movement is also followed by the supporting element 30, since the latter will reduce or cancel its counter-force still acting on the roller elements 32 and, to that extent, the roller elements 32 are also moved radially outward.

The actuating force characteristic of the system shown in FIG. 1 will be described in the following with reference to FIGS. 3 to 5 as a function of different designs of the spring characteristic of the spring element 72.

First, FIG. 3 shows the case in which the spring element 72 provides a substantially constant force along the actuating path. The spring element 24 or actuating force transmission element 24 has an ascending characteristic line, specifically a progressively ascending characteristic line, at least in the second area of the engagement path. In this case, it must also be taken into account, particularly when using a clutch disk 22 with lining suspension, that there is an additional force component which acts in the releasing direction and which can also substantially participate in determining the progressive rise of the pressing force with increasing adjustment in the engagement direction. The lifting springs mentioned above also contribute to a total force acting in the clutch releasing direction.

It should be noted that an actuating path of zero corresponds, for example, to a completely released clutch and the change in the actuating path to higher numbers signifies the increasing engagement of the clutch and, therefore, the increasing compression of the actuating force transmission element 24. Particularly when this actuating force transmission element 24 is constructed as a diaphragm spring which, as is well known, has a sine-shaped spring characteristic along the deformation path, it is possible by selecting the pretensioning position of the actuating force transmission element 24 in certain areas to select the area in which the spring characteristic is operated as though there were a progressively ascending, decreasingly ascending or approximately constant curve.

Accordingly, in the case shown in FIG. 3 it will be seen that as the system is adjusted further in the engagement direction the additional required actuating force for initiating the releasing process through the spring elements 24, 72 acting against one another decreases. In extreme cases, namely, when these two springs acting against one another provide the same force but in opposite directions, the actuating force would be zero. With progressing release, however, the force to be transmitted to the sleeve 54 by the actuation bearing 62 to adjust the clutch further in the releasing direction increases as a result of the decrease in the spring force provided by the actuating force transmission element 24. It should be stressed once again that the case discussed here is one in which the roller elements, under the influence of centrifugal force, are arranged in their radial outermost position in which the forces introduced via the sleeve 54, even at their maximum, do not result in a compulsory displacement of these roller elements 32 radially inward.

In the case shown in FIG. 3, in which the force provided by the spring element 72 remains substantially constant regardless of the actuating path, the curve of the actuating force is substantially the inverse of the curve of the force acting in the releasing direction which is provided by the actuating force transmission element 24.

Figure 4:
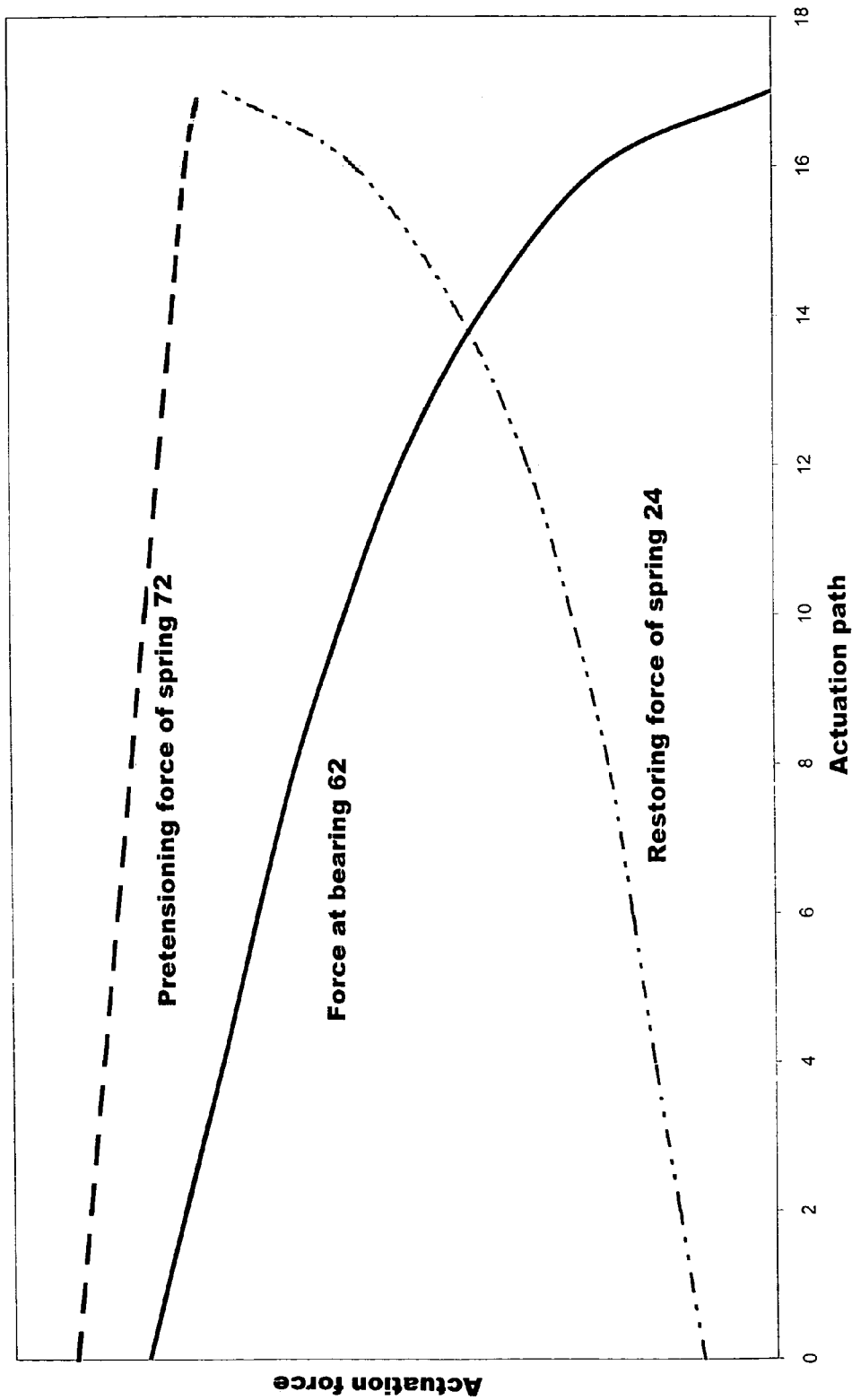

FIG. 4 shows a case in which the spring force provided by the spring element 72 decreases as the clutch is adjusted in the clutch engagement direction. Also, it is noted that this can be achieved in that a spring element constructed as a diaphragm spring is set up and held under pretensioning in such a way that operation takes place within a corresponding segment of the spring characteristic line. In this case, also, the force to be applied at the actuation bearing 62 which is required for compulsory release when the roller elements 32 are held at the radial outer side is given substantially by the difference between the force provided by the spring element 72 and the force provided or transmitted by the actuating force transmission element 24. Due to the force of the spring element 72 which increases in the clutch release direction, there is also a steeper rise in the force to be applied at the bearing 62 in the clutch release direction. This curve is particularly advantageous when the force to be exerted on the actuation bearing 62 is provided by an automated system using a pressure-medium cylinder or an electric-motor drive. In terms of regulating technique, such systems are easier to handle with respect to the adjustment of an actuating lift when the force required for release has a greater slope. Also, the susceptibility to vibrations in fast adjusting processes or readjusting processes is reduced and the detection and maintenance of an engagement position can be regulated more easily. Further, it must be taken into account that due to the rise in the counter-force of the spring element 72 during a compulsory clutch release, the state in which the roller elements 32 are displaced compulsorily radially inward against the action of centrifugal force can occur, which can lead to an at least partial relaxing of the spring element 72 and, consequently, to a reduction in the force required for releasing.

Figure 5:
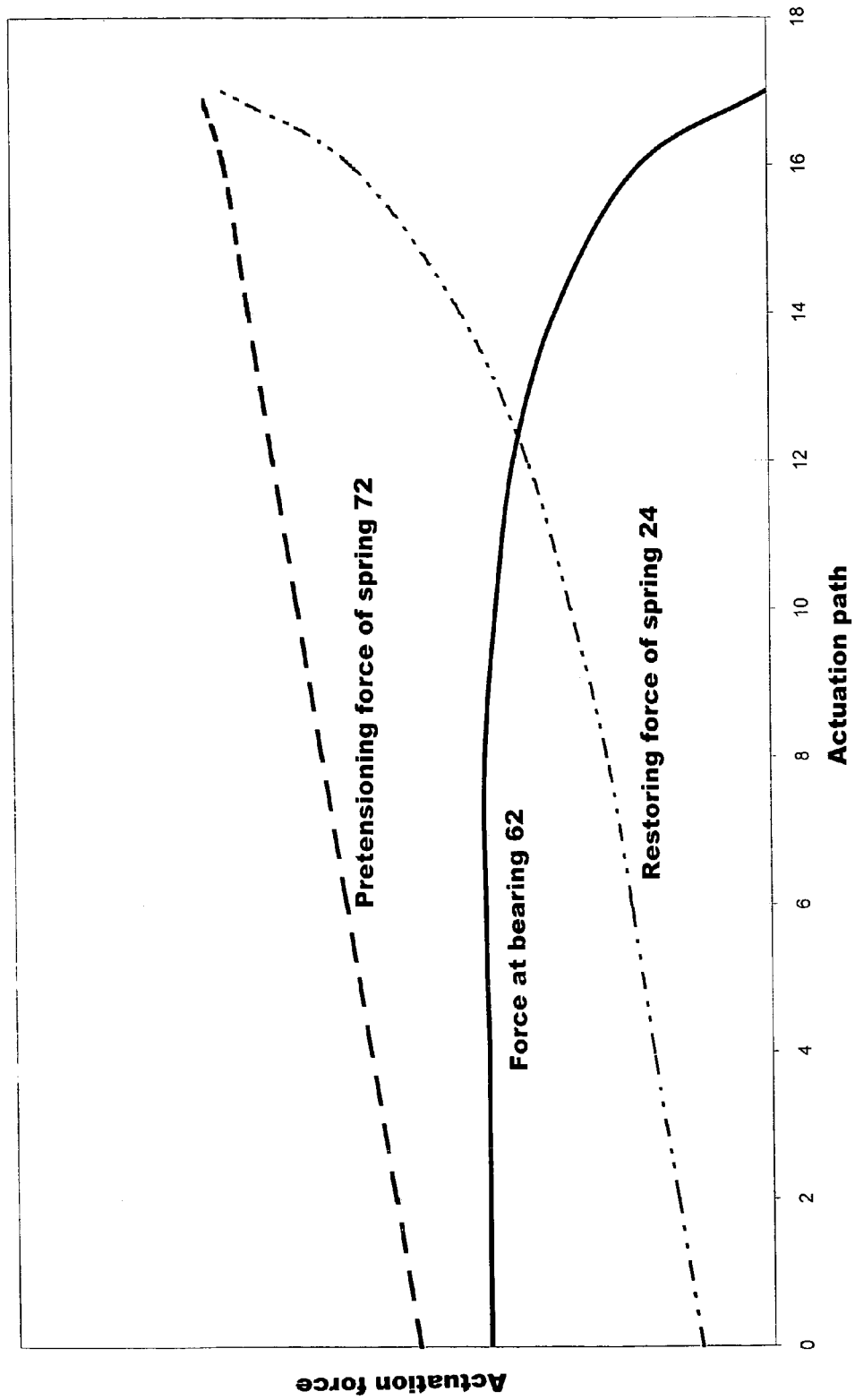

FIG. 5 shows the case in which the spring force provided by the spring element 72 decreases in the releasing direction. In a corresponding manner, the curve of the force to be applied at the bearing 62 also becomes flatter, e.g., is constant, in the release direction. In this case, a decrease in the force to be applied at the actuation bearing 62 when approaching the clutch release position would be possible through an even more pronounced decrease in the force provided by the spring element 72 in the clutch release direction.

Of course, the two cases described above, in which the force acting against release is provided by the spring element 72 or by the roller elements 32 which are acted upon by centrifugal force, can be superimposed. This may be the case when this force provided by the spring element 72 increases when this spring element 72 is compressed to a value which causes the roller elements 32 to be compulsorily displaced radially inward even before the spring element 72 is completely compressed. Of course, this also relates to the degree to which the supporting areas 34, 36 are inclined with respect to one another and whether or not there is an area with a smaller relative inclination angle in the radial outer area as can also be seen from FIG. 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A centrifugal clutch comprising:
   a housing which is rotatable about an axis, said housing having a plurality of first support areas which each extend radially with respect to said axis;
   a pressing plate which is axially movable with respect to said housing and is coupled to said housing for rotation about said axis;
   a supporting element which is axially movable with respect to said housing, said support element having a plurality of second support areas which each extend radially with respect to said axis, each said second support area being separated from a respective said first support area by an axial distance which decreases with radial distance from the axis;
   a plurality of centrifugal members supported between respective pairs of first and second support areas, each said centrifugal member being radially displaceable by centrifugal force along the respective pair of support areas to exert force along a force transmission path between the supporting element and the pressing plate;
   an energy accumulator arrangement acting between the supporting element and the pressing plate to load the pressing plate away from the supporting element in a clutch engaging direction; and
   a clutch release arrangement for providing a releasing force in opposition to the loading of the energy accumulator arrangement.

2. A centrifugal clutch as in claim 1 wherein said energy accumulator arrangement comprises:
   a first energy accumulator in the force transmission path between the supporting element and the pressing plate, wherein the first energy accumulator is supported with respect to the supporting element, said clutch release arrangement acting on said first energy accumulator; and
   a second energy accumulator in the force transmission path between the supporting element and the pressing plate, wherein the second energy accumulator is supported with respect to the pressing plate, said second energy accumulator being supported with respect to said first energy accumulator to load the pressing plate away from the supporting element.

3. A centrifugal clutch as in claim 2 wherein the clutch release arrangement comprises a transmission element which is axially moveable with respect to the housing, said first and second energy accumulators being supported against said transmission element in opposite working directions, said releasing force acting on said transmission element in a direction opposite to the working direction of the first energy accumulator.

4. A centrifugal clutch as in claim 3 further comprising an axial movement limiting arrangement for limiting relative axial movement between the supporting element and the transmission element.

5. A centrifugal clutch as in claim 2 wherein the first energy accumulator provides a force which is greater than the force provided by the second energy accumulator in all adjusted states of the friction clutch.

* * * * *